3,215,675
CARBONYL POLYMERS OF DIALDEHYDES AND
PROCESSES FOR PREPARING THE SAME
Jerry N. Koral, Stamford, and Howard R. Lucas, Greenwich, Conn., assignors to American Cyanamid Company, Stamford, Conn., a corporation of Maine
No Drawing. Filed July 10, 1962, Ser. No. 208,936
9 Claims. (Cl. 260—67)

This invention relates to a novel process for the carbonyl polymerization of various dialdehyde monomers and to the polymers produced thereby. More particularly, this invention relates to a novel carbonyl polymerization process for the production of polymers of various dialdehydes and to the polymers per se. Still more particularly, this invention relates to a novel method for the carbonyl polymerization of various saturated, unsaturated, substituted or unsubstituted dialdehyde monomers and to the novel carbonyl polymers produced thereby. Still more particularly, this invention relates to a novel group of polymers and to the process for the production thereof.

It is known in the art that various dialdehyde monomers may be spontaneously polymerized. The polymers produced from known procedures, are however, commercially very unattractive in regard to their characteristics and properties. The most deterring feature concerning said known dialdehyde polymers is that they are infusible and/or thermally unstable. Therefore, when said polymers are slightly heated, the monomeric form of the dialdehydes is regenerated. Additionally, some of the prior art polymers, when immersed in water at room temperature, will depolymerize. Products containing these known polymeric materials are, therefore, very poor and limited in regard to their industrial application.

We have found that polymers produced according to our novel process are very thermally stable and fusible. Additionally, our novel polymers have excellent solvent resistance and may be molded, extruded or otherwise shaped into various and sundry flexible and transparent articles having any number of commercial and industrial uses. We have discovered an economic process for the production of a novel group of thermoplastic resins which is easily conducted, is very rapid and results in the production of high yields of polymer. The polymers have relatively high softening points and therefore may be advantageously used, alone or in combination with other resins, to produce stabilized materials and various articles which may come into contact with high temperature.

It is an object of the present invention to provide a process for the carbonyl polymerization of various dialdehyde monomers.

It is a further object of the present invention to provide an economic process for the production of a novel group of fusible, thermally stable, moldable, solvent resistant carbonyl polymeric resins.

It is a further object of the present invention to provide a group of fusible, thermally stable, moldable, solvent resistant carbonyl resins produced from various saturated, unsaturated, substituted or unsubstituted dialdehyde monomers.

These and further objects of the present invention will become more apparent to those skilled in the art upon reading the more detailed description set forth hereinbelow.

The monomeric dialdehydes which may be polymerized according to our novel process include those represented by the formula (I) 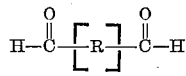

wherein R represents an alkylene radical having 1 to 10 carbon atoms, inclusive, or an alkenylene radical having from 2 to 10 carbon atoms, inclusive, each bearing up to 10 substituents selected from the group consisting of halogen, hydroxy, cycloalkyl, aryl, alkoxy, alkaryl and aralkyl radicals, said alkyl-containing substituents having 1 to 4 carbon atoms, inclusive. It is to be understood that the terms "alkylene" and "alkenylene" include both branched and straight chain radicals such as isobutylene, 2,4-dimethyl hexylene, 3,7-dimethyloctylene, 2-propyl butenylene radicals and the like. It is to be further understood that any individual dialdehyde monomer may contain two or more of the above cited substituents and still fall within the scope of the present invention.

A preferred group of the dialdehyde monomers to be used in the process of the present invention comprises those dialdehyde monomers wherein the two aldehyde groups are attached to the terminal carbon atoms of an unsubstituted, aliphatic, saturated alkylene chain containing from 1 to 10 carbon atoms, inclusive.

Examples of dialdehyde monomers which are represented by Formula I, above, and therefore may be used as the feed materials to the process of the present invention include malonaldehyde, succinaldehyde, glutaraldehyde, adipaldehyde, pimelaldehyde, suberaldehyde, azelaaldehyde, sebacaldehyde, dodecanedial, glutaconaldehyde, α-hydromuconaldehyde, β-hydromuconaldehyde, 2-ethyl-β-hydromuconaldehyde, 2-hydroxyadipaldehyde, 3-methoxy-pimelaldehyde, 3-chloro-2,4-dimethyl glutaraldehyde, 2-butyl-2-ethylglutaraldehyde, 2-cyclohexylsuberaldehyde, 5-phenylsuberaldehyde, 2,4-ditolyl suberaldehyde, 2,3,4-tributaylglutaconaldehyde, 3-(methylbenzyl)adipaldehyde, 3-methylglutaraldehyde, 3-phenylsuberaldehyde, 3-4-ditolyladipaldehyde, 3-hydroxy-2,4-dimethylglutaraldehyde, 3-bromo-5-ethoxy-8-benzyl-dodecanedial and the like. These and other useful dialdehydes are disclosed in and may be prepared according to various processes known in the art and exemplified by U.S. Patents 2,546,018, 2,702,823 and 2,639,297.

The dialdehydes represented by Formula I above, may be polymerized alone or in admixture with one another by our novel procedure set out more fully hereinbelow.

Our novel process for polymerizing the above dialdehydes comprises a solvent polymerization system wherein any material known to be a solvent for the dialdehyde feed may be used. Examples of solvents which may be used include toluene, xylene, methylene chloride, ether, chloroform, carbon tetrachloride and the like.

The monomer concentration in said solvents is critical and generally ranges from about 1 to 20 percent by weight, based on the total weight of the monomer and solvent employed. The amount of monomer employed however, materially effects the type of polymer produced by the process. That is to say, a lower concentration of monomer in the solvent will result in a polymer containing fewer carbonyl groups. Further discussion of the phenomenon can be found hereinbelow in regard to the discussion of our novel polymeric products.

The reaction is carried out at a temperature ranging from about —80° C. to +20° C., preferably —76° C. to —20° C., at atmospheric pressure. Higher or lower pressures may be employed without departing from the efficacy of the process or the properties of the polymers, if necessary or desirable.

A catalyst must be present during our process and generally any anionic or cationic catalyst may be employed in amounts ranging from about 0.5 to 15.0 mole percent, preferably 1 to 10.0 mole percent, per mole of dialdehyde monomer. Among the catalysts which may be employed are BF$_3$·etherate, diethyl zinc, the alkali alkyls, e.g., n-butyl lithium, the alkali alkoxides, e.g., lithium sec.-butoxide, LiAlH$_4$, the trisubstituted phosphines having the formula (II) 

wherein R$_1$, R$_2$ and R$_3$ are the same or different monovalent alkyl radicals having from 1 to 18 carbon atoms, inclusive, such as triethyl phosphine, tributyl phosphine, tristearyl phosphine, tricyclohexyl phosphine, methyl dioctyl phosphine and the like, the Lewis acids e.g. AlCl$_3$, AlBr$_3$, SbCl$_5$, SbCl$_3$, SbF$_3$, BF$_3$ gas, FeCl$_3$, AsF$_3$, AsCl$_3$, SnCl$_4$, TiCl$_3$, TiCl$_4$, ZnCl$_2$, I$_2$ alsco the aluminum lower alkyls of 1 to 4 carbon atoms, inclusive, having the formulae Al(R)$_3$, Al(R)$_2$Cl or AlRCl$_2$ such as triethyl aluminum, tributyl aluminum, diethyl aluminum chloride, dipropyl aluminum chloride, ethyl aluminum dichloride, propyl aluminum dichloride and the like.

It is preferred to conduct the polymerization reaction in the presence of an non-oxygen containing inert gas, with such inert gases as nitrogen, helium, argon, neon, normally gaseous hydrocarbons, i.e., propane, butane, etc., and the like being exemplary. By "non-oxygen containing gas" is meant any inert gas wherein oxygen does not exist, in admixture therewith or in combined form, with the inert gaseous material used.

Reaction times of the polymerization reaction are generally fast and it is usually only necessary to conduct the reaction for about 30 minutes to 2 hours, generally depending upon the catalyst, monomer and solvent involved in the specific reaction. However, a longer contact time, i.e., up to 16 hours may be used in order to insure complete reaction.

As mentioned briefly above, the monomeric concentration of the dialdehyde in solvent solution charged to our novel polymerization process is critical and two different types of polymeric materials are produced depending upon said concentration. That is to say, the specific polymer produced in any given polymerization reaction is governed by the concentration of the monomeric dialdehyde in solvent solution during the reaction. When high concentrations of monomer are charged to the polymerization zone, one type of polymer is produced, while a low concentration results in the production of a different type of polymer. This phenomena can best be shown by reference to the polymeric structures of each type of polymer.

The polymer which is produced utilizing a high monomer concentration is composed of recurring units of the formula (III) 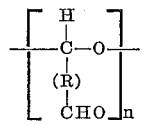

wherein R is as defined above in regard to Formula I. We have found that monomer concentrations of above about 4%, i.e., 4.1 to 20% in the solvent solutions result in the production of polymers of this type.

Monomer concentrations of up to about 4% i.e., 1% to 4%, however, cause the formation of polymers composed of recurring units of the formula (IV) 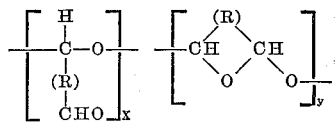

wherein R is defined as set forth above in regard to Formula I and the ratio of $x$ to $y$ ranges from about 100:1 to about 1:70, generally from about 70:1 to about 1:30.

It can readily be seen that polymers conforming to those of Formula III are produced at high monomer concentrations and those conforming to Formula IV are produced at low monomer concentrations. No specific theory can be advanced at this time regarding this phenomena however, the existence of said structures is supported by infrared spectrum analysis wherein the presence of substantially fewer carbonyl groups is shown at low monomer concentrations than at high concentrations. The polymers of Formula III are formed through one of the carbonyl groups leaving the other as a free, crosslinkable, pendant group, while those of Formula IV are formed by an interintramolecular carbonyl polymerization with the formation of ring structures.

Evidence of an insignificant amount of cross-linking in the polymers of Formula III is also shown by infrared analysis. This cross-linking probably occurs through the free pendant aldehyde groups and results in a polymer with a slightly better solvent resistance and heat stability than those produced at low monomer concentrations.

The polymers of this invention generally range from water-white to yellow in color, and are brittle solids. The polymers of the first type, above, are insoluble in all well known solvents, a factor which may indicate a slight degree of cross-linking in the polymer, as mentioned above. Additionally, the polymers have softening points ranging from about 87° C. to about 160° C.

The polymers are thermoplastic in nature and can generally be used for all purposes known for thermoplastic resins with moldings, adhesives, films, fibers, foils, castings and the like being exemplary. They can be used as such or may be modified with fillers, lubricants, dyes, pigments and the like.

As mentioned above the monomers of Formula I, above, may be homopolymerized or copolymerized with each other according to our novel process. Additionally, they may also be copolymerized with monofunctional aldehydes such as acetaldehyde, butyraldehyde, etc. in order to produce copolymeric materials also adaptable to uses known for thermoplastic materials.

The following examples are set forth for purposes of illustration only and are not to be construed as limitations on the present invention, except as set forth in the appended claims. All parts and percentages are by weight unless otherwise indicated.

*Example 1*

To a suitable reaction vessel equipped with stirrer, gas inlet and rubber serum stopper are added 8.67 parts of toluene and 0.97 part of suberaldehyde. The solution is cooled to −20° C. and nitrogen gas is bubbled therethrough for 15 minutes. To this solution is then added 0.1 part of BF$_3$·etherate. A viscosity build-up is observed immediately and after 2 hours the polymer is precipitated into a large excess of cold heptane. The polymer is washed with more cold heptane and dried under vacuum for 20 hours at 30° C. A polymer is recovered in a yield of 70%. The polymer is insoluble in dimethyl formamide, acetone, toluene, ethyl cellosolve and dioxane. It has a softening point of about 120° C. Infrared spectrum shows the presence of approximately equal concentrations of carboxyl groups (1720 cm.$^{-1}$) and ether groups (1150 cm.$^{-1}$) plus a small amount of hydroxyl groups (3400 cm.$^{-1}$). This indicates a polymer having recurring units of the formula

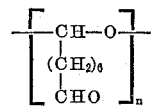

At 130° C. and 5000 p.s.i., a homogeneous brittle disc of the polymer is formed by molding in a mold of the pressure type.

*Example 2*

To a suitable reaction vessel equipped as described in Example 1, are added 38.15 parts of toluene and 0.75 part of suberaldehyde. The solution is cooled to −20°

C. and nitrogen gas is bubbled through for 15 minutes. To this solution is then added 0.08 part of BF₃·etherate. A viscosity build-up is observed immediately and after one hour the polymer is precipitated into a large excess of cold heptane. The polymer is washed with more cold heptane and dried under vacuum for 20 hours at 30° C. A polymer is recovered in a yield of 76%. The polymer is insoluble in dimethyl formamide, acetone, toluene and benzyl alcohol. It has a softening point of about 100° C. An infrared spectrum shows the presence of approximately four times as many ether groups (1150 cm.⁻¹) as carboxyl groups (1120 cm.⁻¹). This indicates that the polymer structure is a composite of the recurring units

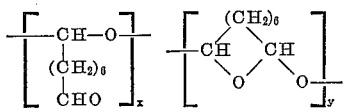

wherein the ratio of $x$ to $y$ is about 1:1.

*Example 3*

To a suitable reaction vessel, equipped as described in Example 1, are added 0.97 part of suberaldehyde and 8.65 parts of toluene. The solution is cooled to —20° C. and nitrogen gas is bubbled through for 15 minutes. To this solution is then added 0.06 part of triethyl aluminum, dissolved in 0.22 part of n-pentane. The polymerization is allowed to proceed for 16 hours and the polymer is recovered by precipitation into a large excess of cold heptane. The polymer is washed with more cold heptane, and dried under vacuum for 20 hours at 30° C. A polymer is recovered in a yield of 53%. The polymer is insoluble in dimethyl formamide, acetone, toluene and dioxane. It has a softening point of about 165° C. The infrared spectrum of the polymer shows the presence of approximately equal concentrations of carbonyl groups (1720 cm.⁻¹) and ether groups (1150 cm.⁻¹). This indicates a polymer structure similar to that described in Example 1. At 160° C. and 5600 p.s.i., a homogeneous brittle disc of the polymer is formed in a mold.

*Example 4*

To a suitable reaction vessel, equipped as described in Example 1, is added a solution containing 1.0 part of glutaraldehyde and 7.83 parts of toluene. The solution is cooled to —76° C. and nitrogen gas is bubbled through for 15 minutes. To this solution is then added 0.1 part of BF₃·etherate. Immediate polymerization is observed and after 2 hours, the polymer is recovered by precipitation into a large excess of cold heptane. The polymer is washed with more cold heptane and dried under vacuum for 20 hours at 30° C. A polymer is recovered in a 76% yield. The polymer is insoluble in acetone, toluene, ethyl cellosolve and dimethyl formamide. It has a softening point of about 140° C. The infrared spectrum shows the presence of approximately equal concentrations of carbonyl groups (1720 cm.⁻¹) and ether groups (1150 cm.⁻¹). This indicates a polymer having recurring units of the formula

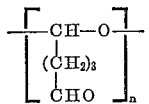

At 140° C. and 5600 p.s.i., a homogeneous, brittle disc of the polymer is formed in a mold.

*Example 5*

To a suitable reaction vessel, equipped as described in Example 1, are added 34.4 parts of toluene and a solution containing 0.9 part of glutaraldehyde in 7.83 parts of toluene. The mixture is cooled to —76° C. and nitrogen gas is bubbled through for 15 minutes. To this solution is then added 0.08 part of BF₃·etherate and after 20 hours the polymer is precipitated into a large excess of cold heptane. The polymer is washed with more cold heptane and dried under vacuum for 20 hours at 30° C. A polymer is recovered in a yield of 83%. The polymer is insoluble in toluene, acetone, dioxane, and dimethyl formamide. The infrared spectrum of the polymer shows the presence of approximately three times as many ether groups (1150 cm.⁻¹) as carbonyl groups (1720 cm.⁻¹). This indicates that the polymer structure is a composite of two recurring units, namely:

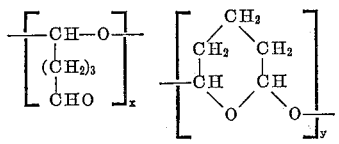

wherein the ratio of $x$ to $y$ is approximately 1:1.

*Example 6*

To a suitable reaction vessel, equipped as described in Example 1, is added a solution of 1 part of glutaraldehyde in 7.83 parts of toluene. The mixture is cooled to —76° C. and nitrogen gas is bubbled through for 15 minutes. To this solution is then added a solution containing 0.08 part of triethyl aluminum in 0.29 part of n-pentane. The polymer is isolated by precipitation into a large excess of cold pentane. It is then washed with fresh hexane and dried 16 hours in a vacuum oven at 30° C. A polymer is recovered in a yield of 95%. It is insoluble in dimethyl formamide, toluene, acetone, dioxane, and ethyl cellosolve. The infrared spectrum indicates a polymer structure similar to that described in Example 4. The polymer has a softening point around 120° C. and at 115° C. and 5600 p.s.i., a homogeneous, brittle disc of the polymer is formed in a mold.

*Example 7*

Following the procedure of Example 1, a polymer similar to that produced therein is produced utilizing an equivalent amount of alpha-hydroxy suberaldehyde in place of the suberaldehyde used therein. The polymer has a softening point around 125° C. and is readily formed into a brittle product upon molding it at 119° C. and 5500 p.s.i.

*Example 8*

Again following the procedure of Example 1, a polymer composed of —C—O— linkages having pendant, free, aldehyde groups is formed utilizing beta-methoxy suberaldehyde as the monomer charge. The polymer is moldable at 125° C. and 5200 p.s.i.

*Example 9*

Utilizing the procedure of Example 2, except that alpha-methyl, beta-chloro suberaldehyde is substituted, in equal amounts, for the monomer charged therein, a composite polymer composed of —C—O— linkages containing pendant aldehyde groups and cyclic linkages is formed. The softening point of the polymer is about 105° C.

*Example 10*

Again following the procedure of Example 2, a similar polymer as produced therein is formed utilizing, as the monomer charge, beta, gamma-dibenzyl glutaconaldehyde.

*Example 11*

Following the procedure of Example 1, an aldehyde polymer containing free, pendant aldehyde groups is formed utilizing alpha-cyclohexyl adipaldehyde as the monomeric charge.

*Example 12*

Utilizing beta-phenyl glutaraldehyde and following the procedure of Example 2, a composite polymer similar to that produced therein, is recovered in a yield of 74%.

We claim:
1. A stable, fusible polymer of a glutaraldehyde composed solely of recurring units of the formula

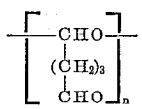

wherein $n$ is the number of recurring units in the polymer.

2. A stable, fusible polymer of a glutaraldehyde composed solely of recurring units of the formula

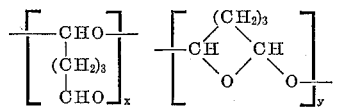

wherein the ratio of $x$ to $y$ ranges from 1:100 to 70:1.

3. A stable, fusible polymer of a suberaldehyde composed solely of recurring units of the formula

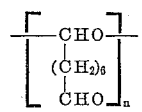

wherein $n$ is the number of recurring units in the polymer.

4. A stable, fusible polymer of a suberaldehyde composed solely of recurring units of the formula

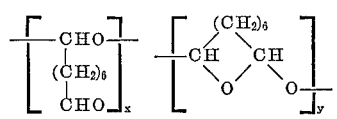

wherein the ratio of $x$ to $y$ ranges from 1:100 to 70:1.

5. A stable, fusible polymer of a dialdehyde composed solely of recurring units of the formula

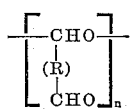

wherein R is an alkylene radical having from 1 to 10 carbon atoms, inclusive, bearing up to 10 substituents selected from the group consisting of halogen, hydroxy, cycloalkyl, aryl, alkoxy, alkaryl, and aralkyl radicals and $n$ is the number of recurring units in the polymer.

6. A stable, fusible polymer of a dialdehyde composed solely of recurring units of the formula

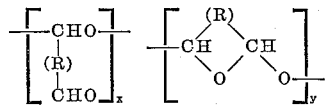

wherein R is an alkylene radical having from 1 to 10 carbon atoms, inclusive, bearing up to 10 substituents selected from the group consisting of halogen, hydroxy, cycloalkyl, aryl, alkoxy, alkaryl, and aralkyl radicals and the ratio of $x:y$ ranges from 1:100 to 7:1.

7. A process for the carbonyl polymerization of a dialdehyde which comprises contacting a monomer composition consisting of at least one compound having the formula

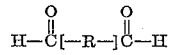

wherein R is an alkylene radical having 1–10 carbon atoms, inclusive, bearing up to 10 substituents selected from the group consisting of halogen, hydroxy, cycloalkyl, aryl, alkoxy, alkaryl and aralkyl radicals, with a polymerization catalyst selected from the group consisting of boron trifluoride etherate, diethyl zinc, the alkali alkyls, the alkali alkoxides, LiAlH$_4$, the trialkyl phosphines, the Lewis acids, the aluminum lower alkyls and the aluminum lower alkyl chlorides, at a temperature of from —76° C. to —20° C. at a monomer concentration, in a solvent therefor, of from about 1% to 20%, by weight.

8. A process for the carbonyl polymerization of glutaraldehyde which comprises contacting glutaraldehyde with a polymerization catalyst selected from the group consisting of boron trifluoride etherate, diethyl zinc, the alkali alkyls, the alkali alkoxides, LiAlH$_4$, the trialkyl phosphines, the Lewis acids, the aluminum lower alkyls, and the aluminum lower alkyl chlorides, at a temperature of from —76° C. to —20° C. and at a glutaraldehyde concentration, in a solvent therefor, of from about 1% to 20%, by weight.

9. A process for the carbonyl polymerization of suberaldehyde which comprises contacting suberaldehyde with a polymerization catalyst selected from the group consisting of boron triflouride etherate, diethyl zinc, the alkali alkyls, the alkali alkoxides, LiAlH$_4$, the trialkyl phosphines, the Lewis acids, the aluminum lower alkyls, and the aluminum lower alkyl chlorides, at a temperature of from —76° C. to —20° C. and at a suberaldehyde concentration, in a solvent therefor, of from about 1% to 20%, by weight.

References Cited by the Examiner
UNITED STATES PATENTS

| | | | |
|---|---|---|---|
| 2,526,702 | 10/50 | Smith | 260—344 |
| 2,809,186 | 10/57 | Smith et al. | 260—67 |
| 2,826,514 | 3/58 | Schroeder | 260—67 |

FOREIGN PATENTS 876,956   9/61   Great Britain.

OTHER REFERENCES

Aso et al., Bull. Chem. Soc., Japan, vol. 35, No. 8, 1426 (August 1962).

WILLIAM H. SHORT, *Primary Examiner.*